(12) United States Patent  
Sprague et al.

(10) Patent No.: US 9,226,626 B2
(45) Date of Patent: Jan. 5, 2016

(54) TOWEL

(71) Applicants: Joshua Clay Sprague, Corona, CA (US); Elizabeth Sprague, Corona, CA (US)

(72) Inventors: Joshua Clay Sprague, Corona, CA (US); Elizabeth Sprague, Corona, CA (US)

( * ) Notice: Subject to any disclaimer, the term of this patent is extended or adjusted under 35 U.S.C. 154(b) by 40 days.

(21) Appl. No.: 13/844,367

(22) Filed: Mar. 15, 2013

(65) Prior Publication Data

US 2014/0150156 A1 Jun. 5, 2014

Related U.S. Application Data

(60) Provisional application No. 61/732,899, filed on Dec. 3, 2012.

(51) Int. Cl.
*A47K 10/02* (2006.01)
*A41D 7/00* (2006.01)
*B60N 2/44* (2006.01)

(52) U.S. Cl.
CPC .............. *A47K 10/02* (2013.01); *A41D 7/008* (2013.01); *B60N 2002/4405* (2013.01)

(58) Field of Classification Search
CPC ............................. A47K 10/02; A41D 7/008
USPC ............................................. 2/88, 89, 69, 84
See application file for complete search history.

(56) References Cited

U.S. PATENT DOCUMENTS

| | | | | | |
|---|---|---|---|---|---|
| 1,916,068 | A | * | 6/1933 | Nyhagen | 2/88 |
| 2,313,399 | A | * | 3/1943 | Smink | 2/211 |
| 2,344,010 | A | * | 3/1944 | Walsh | 2/69 |
| 2,588,536 | A | * | 3/1952 | Kaplan | 5/413 R |
| 2,621,331 | A | * | 12/1952 | Loretto | 2/75 |
| 2,659,086 | A | * | 11/1953 | McGrath | 2/88 |
| 2,659,404 | A | * | 11/1953 | Kelsey | 383/4 |
| 2,706,817 | A | * | 4/1955 | Schneider | 2/84 |
| 3,079,611 | A | * | 3/1963 | Boryszewski | 2/89 |
| 5,322,918 | A | * | 6/1994 | Kirby | 428/192 |
| 5,490,528 | A | * | 2/1996 | Day | 132/200 |
| 5,756,177 | A | * | 5/1998 | Cheong | 428/52 |
| D410,382 | S | * | 6/1999 | Therriault | D2/825 |
| 6,760,921 | B1 | * | 7/2004 | Simmons | 2/84 |
| 7,178,185 | B1 | * | 2/2007 | Nattler | 5/482 |
| 2005/0044606 | A1 | * | 3/2005 | Flanagan-Frazier | 2/69 |
| 2007/0017000 | A1 | * | 1/2007 | Segal | 2/69 |
| 2007/0157355 | A1 | * | 7/2007 | Katsin | 2/22 |
| 2008/0229499 | A1 | * | 9/2008 | Narboni-Campora | 5/413 R |
| 2009/0025119 | A1 | * | 1/2009 | Nespor | 2/84 |
| 2009/0106873 | A1 | * | 4/2009 | Whiteside | 2/69 |
| 2009/0293168 | A1 | * | 12/2009 | Lugtu | 2/69 |
| 2011/0258749 | A1 | * | 10/2011 | Hibbs | 2/84 |
| 2013/0239290 | A1 | * | 9/2013 | Rossi | 2/84 |

* cited by examiner

*Primary Examiner* — Richale Quinn

(57) ABSTRACT

A wearable towel including a securing band provided on a long edge and a zipper provided on a short edge, the towel capable of being worn around the waist of a user and also secured to a headrest of a vehicle.

12 Claims, 2 Drawing Sheets

TOWEL

CROSS REFERENCES TO RELATED APPLICATIONS

The present application is a non-provisional application claiming the benefit of priority under 35 U.S.C. §119(e) from commonly owned and U.S. Provisional Application Ser. No. 61/732,899 filed on Dec. 3, 2012 and entitled "Towel," the entire contents of which are hereby incorporated by reference into this disclosure as if set forth fully herein.

FIELD

This application relates to a backpack and in particular a hydration pack suitable to be worn on the upper back of a user.

SUMMARY OF THE INVENTION

The towel described herein addresses the disadvantages of the prior art workout towels by providing a towel that is capable of being worn about the waist of a user and also being secured to a car seat. Both uses are achieved without the use of straps or tethers that hang from the towel. The towel described herein has a body and a securing band extending along one long edge of the body. The securing band includes a plurality of adjustment features spaced evenly apart from one another and extending from one end of the securing band. An adjustment clip is positioned near the other edge of the securing band on the opposite face of the towel and is configured to engage the adjustment features so that the towel may be secured to a user.

A zipper is positioned on one of the short edges of the towel and is configured to be zipped from the middle of the short edge toward the long edges. This configuration results in the formation of a conical pocket when the zipper is zipped. The conical pocket may be placed over the headrest of a car seat. The body of the towel is then draped over the car seat and the user is able to sit on the towel. The pocket ensures the towel will not move relative to the car seat during use.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DETAILED DESCRIPTION OF A PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The towel disclosed herein boasts a variety of inventive features and components that warrant patent protection, both individually and in combination.

Figure 1:
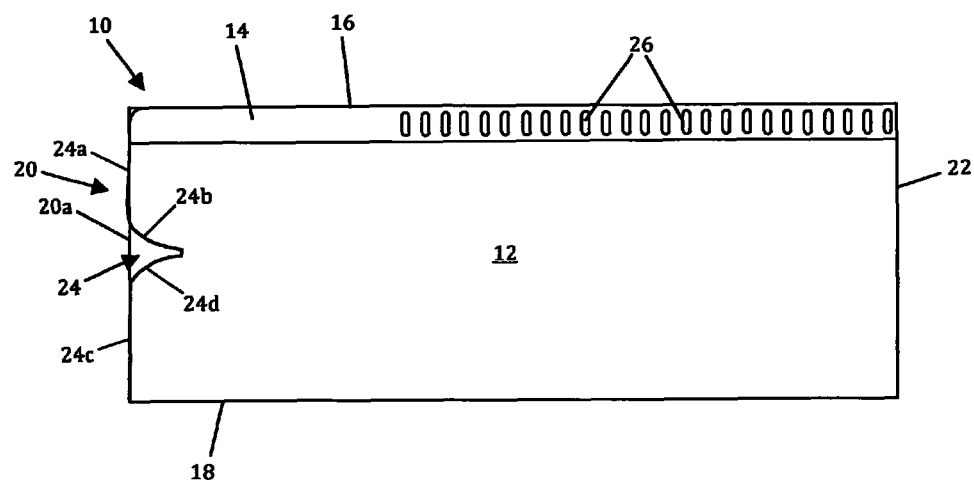
FIG. 1 is a plan view of a towel according to one example embodiment.
Figure 2:
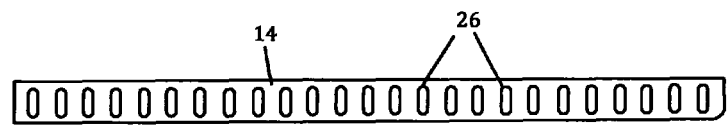
FIG. 2 is a plan view of a securing band forming part of the towel of FIG. 1.
Figure 3:
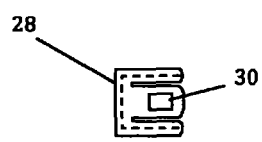
FIG. 3 is a plan view of an adjustment clip forming part of the towel of FIG. 1.
Figure 4:
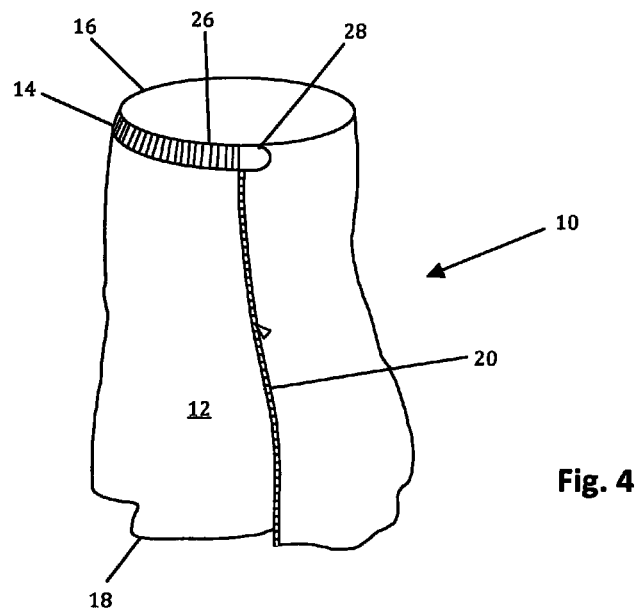
FIG. 4 is a perspective view of the towel of FIG. 1 configured to be worn about the waist of a user.
Figure 5:
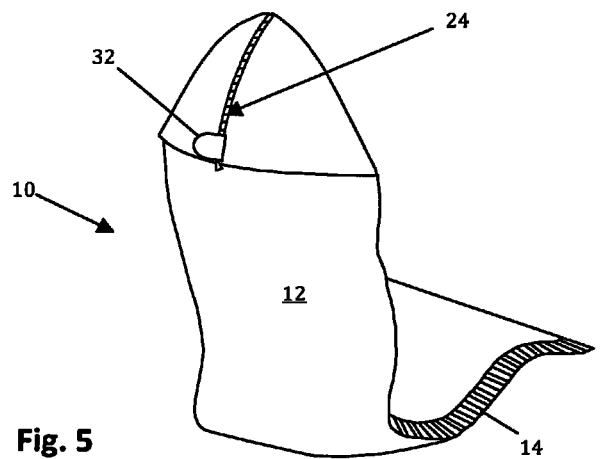
FIG. 5 is a perspective view of the towel of FIG. 1 configured to be placed over a car seat.

FIGS. 1-5 of the present application illustrate one example of a towel 10 suitable for wearing by a user or fastening to a car seat. The towel 10 has a body 12 and a securing band 14 extending along one edge of the body 12. In the example shown and described herein, the towel body 12 has a generally rectangular shape having length dimension L and a width dimension W, although other shapes are possible without departing from the scope of the disclosure. Along the length dimension, the towel 10 has first and second long edges 16, 18. Along the width dimension the towel 10 has first and second short edges 20, 22. The securing band 14 is positioned along the long edge 16 of the towel 10. A zipper 24 is positioned the short edge 20 of the towel 10 and is configured to be zipped from the middle of the first short edge 20 toward the first and second long edges 16, 18. As shown in FIG. 1, the zipper 24 is comprised of a first pair of partial length portions 24a, 24c and a second pair of partial length portions 24b, 24d. The first partial length portions 24a, 24c are attached to the first short edge 20 and extend medially along the first short edge 20 from the first and second long edges 16, 18, respectively, toward the midpoint of the short edge 20. The second partial length portions 24b, 24d are positioned further medially of the first partial length portions 24a, 24c, respectively, and are not attached to the first short edge 20. As a result, the first short edge 20 includes a middle portion 20a that does not have any portion of the zipper feature attached to it. This configuration results in the first short edge 20 resembling a conical shape when the zipper 24 is zipped (FIG. 5). The length dimension L and width dimension W may be any length suitable for use as a workout towel, bath towel, and/or beach towel. In one embodiment, the length dimension is large enough to cover a car seat when one end of the towel is fastened to a headrest.

The securing band 14 is extends along the first long edge 16 and is configured to adjustably secure the towel 10 to a user. Preferably, the towel 10 is secured around the waist of a user. A plurality of adjustment features 26 are positioned along the securing band 14 starting from the second short edge 22 and extending toward the first short edge 20. Preferably, the adjustment features 26 are spaced evenly apart. The adjustment features interact with an adjustment clip 28 (FIG. 3) to allow the user to ensure a secure fit of the towel around the user's waist. The adjustment features 26 may be any suitable receiver for the adjustment clip 28, including but not limited to a loop or hole in the fabric of the towel. The adjustment clip 28 is positioned near the first short edge 20 but on the opposite face of the towel 10 that the adjustment features 26 are on. Thus, when the towel 10 is wrapped around a user, the adjustment clip 28 will be able to engage the adjustment features 26 to secure the towel to the user. The adjustment clip 28 may be any mechanism capable of adjustably securing the clip to the towel. By way of example only, the adjustment clip 28 includes a hook 30, however other features are possible without departing from the scope of the invention.

FIG. 4 illustrates the towel 10 configured for wearing around the waist of a user. The towel 10 is wrapped such that the first short edge 20 is on top of the towel body 12. This will bring the adjustment clip 28 in contact with the adjustment features 26 of the securing band 14. Once the proper amount of wrap is achieved (e.g. so that the towel 10 does not fall off the user) the adjustment clip 28 is engaged with the correct adjustment feature 26 and the towel is secure. To remove the towel, the user disengages the adjustment clip 28 from the adjustment feature 26.

FIG. 5 illustrates the towel 10 configured for placing over a seat of a car. In this configuration, the zipper 24 is activated such that the first short edge 20 forms a conical shape as described above. This conical shape acts as a pocket that may be placed over the headrest of a car seat. The body 12 of the towel is then draped over the car seat and the user is able to sit on the towel. The pocket ensures the towel 10 will not move relative to the car seat during use. Optionally, a zipper flap 32 may be provided to secure the zipper.

While the inventive features described herein have been described in terms of a preferred embodiment for achieving the objectives, it will be appreciated by those skilled in the art that variations may be accomplished in view of these teachings without deviating from the spirit or scope of the invention.

What is claimed is:

1. A multi-purpose wearable towel, comprising:
a generally rectangular swatch of fabric having an outer perimeter defined by a pair of opposing first and second long edges and a pair of opposing first and second short edges, the fabric having the ability to absorb water, the swatch further including a securing band provided along the length dimension of the first long edge of the swatch;
an adjustment clip attached to the swatch at one end of the securing band, the adjustment clip configured to releasably attach to the adjustment band in one of a plurality of attachment locations positioned along the securing band such that when attached, the first long edge of the swatch forms an enclosed aperture; and
a zipper feature provided on the first short edge of the swatch, the zipper feature maneuverable to enable formation of a conical shaped pocket at one end of the towel, the zipper feature having first and second sets of zipper teeth, the first set of zipper teeth extending along the first short edge from a proximal end positioned near the middle of the first short edge to a distal end positioned near the first long edge and including a first length portion attached to the first short edge forming a first zippered edge segment and a second length portion not attached to the first short edge, the second set of zipper teeth extending along the first short edge from a proximal end positioned near the middle of the first short edge to a distal end positioned near the second long edge and including a third length portion attached to the first short edge forming a second zippered edge segment and a fourth length portion not attached to the first short edge, the zipper feature further including a zipper slider initially positioned at the proximal end of the first set of zipper teeth, the zipper slider configured to slideably engage both sets of zipper teeth simultaneously to interlock the first and second sets of zipper teeth as the zipper slider is advanced in a distal direction along the first set of zipper teeth, wherein the first zippered edge segment comprises the distal portion of the first set of zipper teeth, the second zippered edge segment comprises the distal portion of the second set of zipper teeth, the second length portion comprises the proximal portion of the first set of zipper teeth, and the fourth length portion comprises the proximal portion of the second set of zipper teeth.

2. The towel of claim 1, wherein the securing band includes a plurality of adjustment features configured to mate with the adjustment clip to allow for a variable size of the formed enclosed aperture.

3. The towel of claim 2, wherein the plurality of adjustment features comprises a plurality of reinforced apertures formed within the securing band.

4. The towel of claim 3, wherein the adjustment clip comprises a hook member configured to mate with the reinforced apertures.

5. The towel of claim 2, wherein the adjustment features are provided along at least half the length of the securing band.

6. The towel of claim 2, wherein the plurality of adjustment features are evenly spaced along the securing band.

7. The towel of claim 1, wherein the conical shaped pocket is formed when the zipper slider is advanced to a final position and the first and second sets of zipper teeth are interlocked.

8. The towel of claim 7, wherein the formed conical shaped pocket is configured to receive a headrest of a car seat therein.

9. The towel of claim 8, further comprising a zipper flap positioned near the final zipper position.

10. The towel of claim 9, wherein the zipper flap is maneuverable to cover a portion of the interlocked zipper teeth.

11. The towel of claim 1, wherein the first short edge further includes a middle segment positioned between the first and second zippered edge segments.

12. The towel of claim 11, wherein the middle segment does not have zipper teeth attached thereto.

* * * * *